US007717085B1

(12) United States Patent
Bauerle

(10) Patent No.: US 7,717,085 B1
(45) Date of Patent: May 18, 2010

(54) VIRTUAL THROTTLE POSITION SENSOR DIAGNOSTICS WITH A SINGLE CHANNEL THROTTLE POSITION SENSOR

(75) Inventor: Paul A. Bauerle, Fenton, MI (US)

(73) Assignee: GM Global Technology Operations, Inc.

( * ) Notice: Subject to any disclaimer, the term of this patent is extended or adjusted under 35 U.S.C. 154(b) by 11 days.

(21) Appl. No.: 12/263,657

(22) Filed: Nov. 3, 2008

(51) Int. Cl.

| | |
|---|---|
| ***F02D 11/10*** | (2006.01) |
| ***G06F 17/00*** | (2006.01) |
| ***G06F 19/00*** | (2006.01) |
| ***G01M 19/00*** | (2006.01) |

(52) U.S. Cl. .................... 123/399; 73/114.36; 701/107; 701/114; 701/115

(58) Field of Classification Search ................. 123/361, 123/396, 397, 398, 399, 400; 701/103, 104, 701/106, 107, 114, 115; 73/114.36
See application file for complete search history.

(56) References Cited

U.S. PATENT DOCUMENTS

| | | | | | |
|---|---|---|---|---|---|
| 4,490,804 | A | * | 12/1984 | Martinsons | 702/94 |
| 4,586,403 | A | * | 5/1986 | Lee et al. | 123/480 |
| 4,833,613 | A | * | 5/1989 | Mack et al. | 701/51 |
| 5,056,022 | A | * | 10/1991 | Witkowski et al. | 701/63 |
| 5,204,816 | A | * | 4/1993 | Wright et al. | 701/114 |
| 5,235,527 | A | * | 8/1993 | Ogawa et al. | 702/116 |
| 5,568,386 | A | * | 10/1996 | Sugiura et al. | 701/51 |
| 6,109,239 | A | * | 8/2000 | Watanabe | 123/396 |
| 6,178,947 | B1 | * | 1/2001 | Machida et al. | 123/396 |
| 6,250,292 | B1 | * | 6/2001 | Suhre | 123/688 |
| 6,474,301 | B1 | * | 11/2002 | Kamimura et al. | 123/396 |
| 6,619,106 | B2 | * | 9/2003 | Pursifull | 73/114.36 |
| 6,647,958 | B2 | * | 11/2003 | Yokoyama et al. | 123/361 |
| 6,805,094 | B2 | * | 10/2004 | Hashimoto et al. | 123/396 |
| 6,820,604 | B2 | * | 11/2004 | Chong et al. | 123/680 |
| 7,080,549 | B2 | * | 7/2006 | Shao et al. | 73/114.36 |
| 7,603,980 | B2 | * | 10/2009 | Watanabe | 123/399 |
| 2005/0126270 | A1 | * | 6/2005 | Shao et al. | 73/118.1 |

OTHER PUBLICATIONS

SAE International, SAE J2716, Surface Vehicle Information Report, "SENT—Single Edge Nibble Transmission for Automotive Applications", Copyright 2005 SAE International, Date Published: Feb. 2008, pp. 1-15.

SAE International, Appendix to SAE J2716 Information Report, pp. 1-3.

* cited by examiner

*Primary Examiner*—Thomas N Moulis

(57) ABSTRACT

A method and system for operating a throttle system includes a throttle body generating a throttle position sensor signal and encoding the throttle position sensor signal to form an encoded throttle position sensor signal. The system also includes an electronic control module receiving the encoded throttle position sensor signal from a throttle body, forming a first replicated throttle position sensor signal and a second replicated second throttle position sensor signal from the encoded signal and communicating the first replicated throttle position sensor signal and the second throttle position sensor signal to a diagnostics module.

17 Claims, 6 Drawing Sheets

VIRTUAL THROTTLE POSITION SENSOR DIAGNOSTICS WITH A SINGLE CHANNEL THROTTLE POSITION SENSOR

FIELD

The present disclosure relates to replicating a throttle position sensor (TPS) signal during TPS signal diagnostics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a prior art throttle control system 10 for use with an internal combustion engine 14 is shown. Throttle control system 10 includes a throttle body 12 that throttles air to the engine 14 based on a throttle control signal 16. Throttle body 12 includes first and second throttle position sensors 18, 20 that generate respective throttle position signals. Each throttle position signal 18, 20 indicates the same degree of opening of throttle body 12. Using the two throttle positions signals provides redundancy that improves self-diagnostic capabilities. An analog-to-digital converter module 22 digitizes each throttle position signals. A diagnostic module 24 compares the signals to each other and to predetermined diagnostic thresholds. Results of the comparisons indicate whether throttle position signals are valid or corrupted. Examples of corrupted signals include shorted to ground, shorted to a signal excitation voltage, and irrational.

Referring now to FIG. 2, a second embodiment is shown of a throttle control system 10' having a single throttle position sensor. Dual throttle position sensors, such as that illustrated in FIG. 1, are typically not used. Currently, most vehicles use a single throttle position sensor 18 and an analog-to-digital converter 22 that generates a single throttle position sensor signal TP1. However, it is expected that the use of dual throttle position sensing systems will expand. However, single throttle position sensing systems will continue to be used for many years.

The diagnostic module 24' includes diagnostics for diagnosing errors in the single throttle position signal whereas the diagnostic module 24 of FIG. 1 includes diagnostics for sensing errors in two throttle position sensors. Developing and maintaining two sets of diagnostic codes is expensive since two sets of diagnostic codes and two sets of software codes must be maintained.

SUMMARY

The present disclosure allows a common configuration for providing diagnosis for both one- and two-throttle position sensor systems.

In one aspect of the disclosure, a method includes receiving an encoded throttle position sensor signal from a throttle body, forming a first replicated throttle position sensor signal and a second replicated second throttle position sensor signal from the encoded signal and communicating the first replicated throttle position sensor signal and the second throttle position sensor signal to a diagnostics module.

In a further aspect of the disclosure, a system includes a throttle body generating a throttle position sensor signal and encoding the throttle position sensor signal to form an encoded throttle position sensor signal. The system also includes an electronic control module receiving the encoded throttle position sensor signal from a throttle body, forming a first replicated throttle position sensor signal and a second replicated second throttle position sensor signal from the encoded signal and communicating the first replicated throttle position sensor signal and the second throttle position sensor signal to a diagnostics module.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
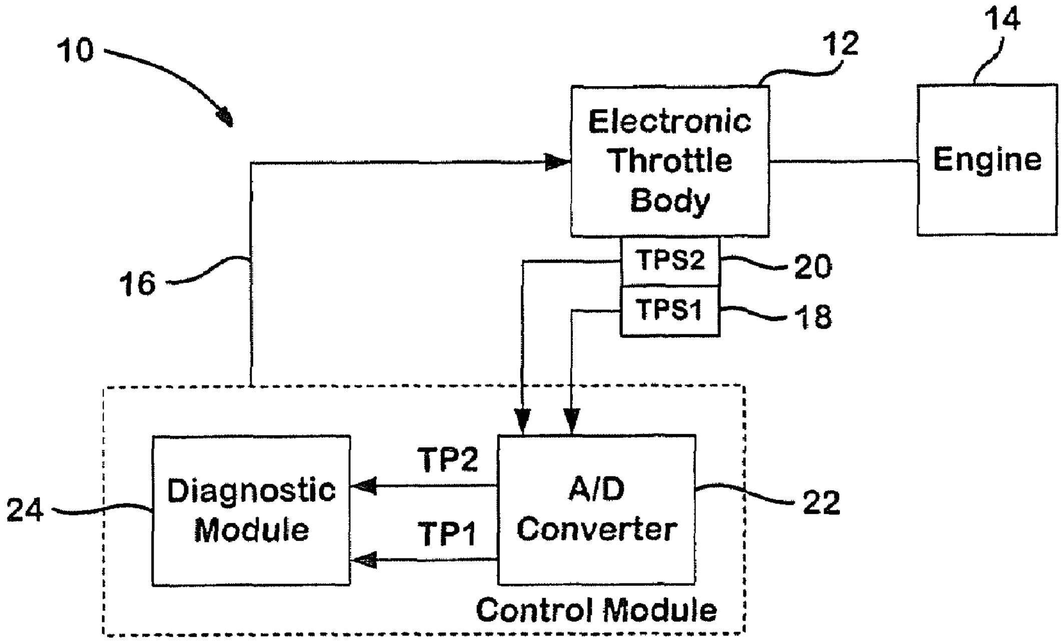
FIG. 1 Prior Art
FIG. 1 is a block diagrammatic view of a two-throttle position sensor throttle control system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 3:
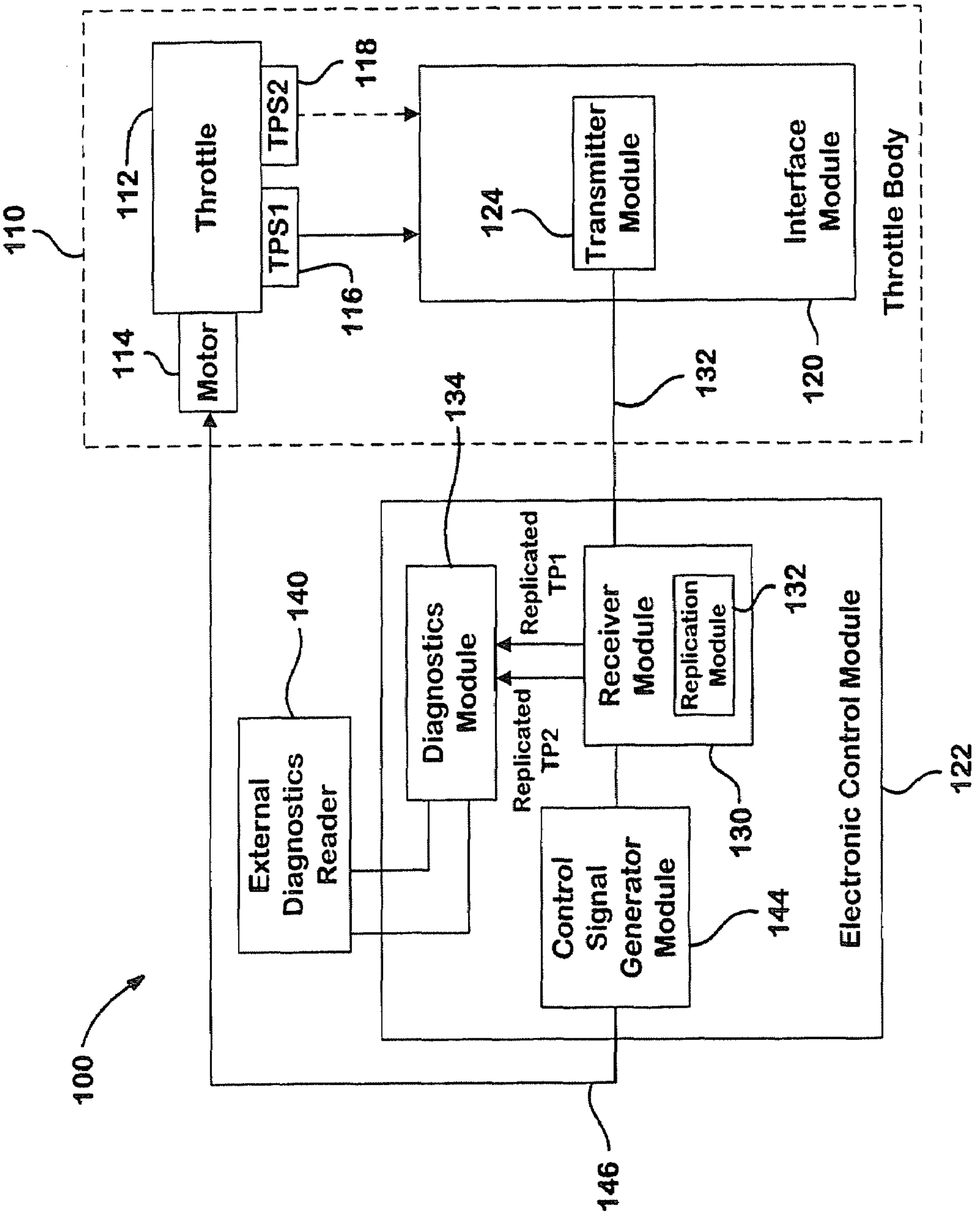
FIG. 3 is a block diagrammatic view of a throttle control system according to the present disclosure.

Referring now to FIG. 3, a throttle body 110 includes a throttle 112, a controlling motor 114 and two throttle position sensors 116 and 118. As mentioned above, both one- and two-throttle position sensor systems are known. The present disclosure allows both single-throttle position sensor and dual-throttle position sensor systems. The signals generated by the throttle position sensor 1 (TPS1) and throttle position sensor 2 (TPS2) may be referred to as raw signals. An interface module 120 receives the signals from the throttle position sensors 116, 118 and ultimately communicates a representation of the signals to an electronic control module 122. A transmitter module 124 is used to format and encode the throttle position sensor or sensor signals for communication to the electronic control module 122.

The electronic control module 122 includes a receiver module 134 receiving the encoded throttle position sensor signals from the transmitter module 124. It should be noted that the throttle body and thus the transmitter module 124 within the interface module 120 are separated physically within a vehicle. A bus or other connection 132 may be used to transmit the signals therebetween. A replication module 132 may also be included within the receiver module. The replication module may be used to replicate a second throttle position sensor signal should the system include only one throttle position sensor. The replication module 132 may also be used to form replicated throttle position sensor signals (replicated TP1, replicated TP2). The replicated throttle position signals are communicated to a diagnostic module 134 that generates diagnostic trouble codes (DTC). The diagnostic trouble codes may be communicated to an external diagnostic reader 140.

The electronic control module 122 may also include a control signal generator module 144. The control signal generator module 144 may generate a control signal 146 that is used to control the motor 114 and thus operate and control the throttle 112. The control signal generator module 144 may receive the replicated throttle signals and generate control signals in response thereto.

Figure 4:
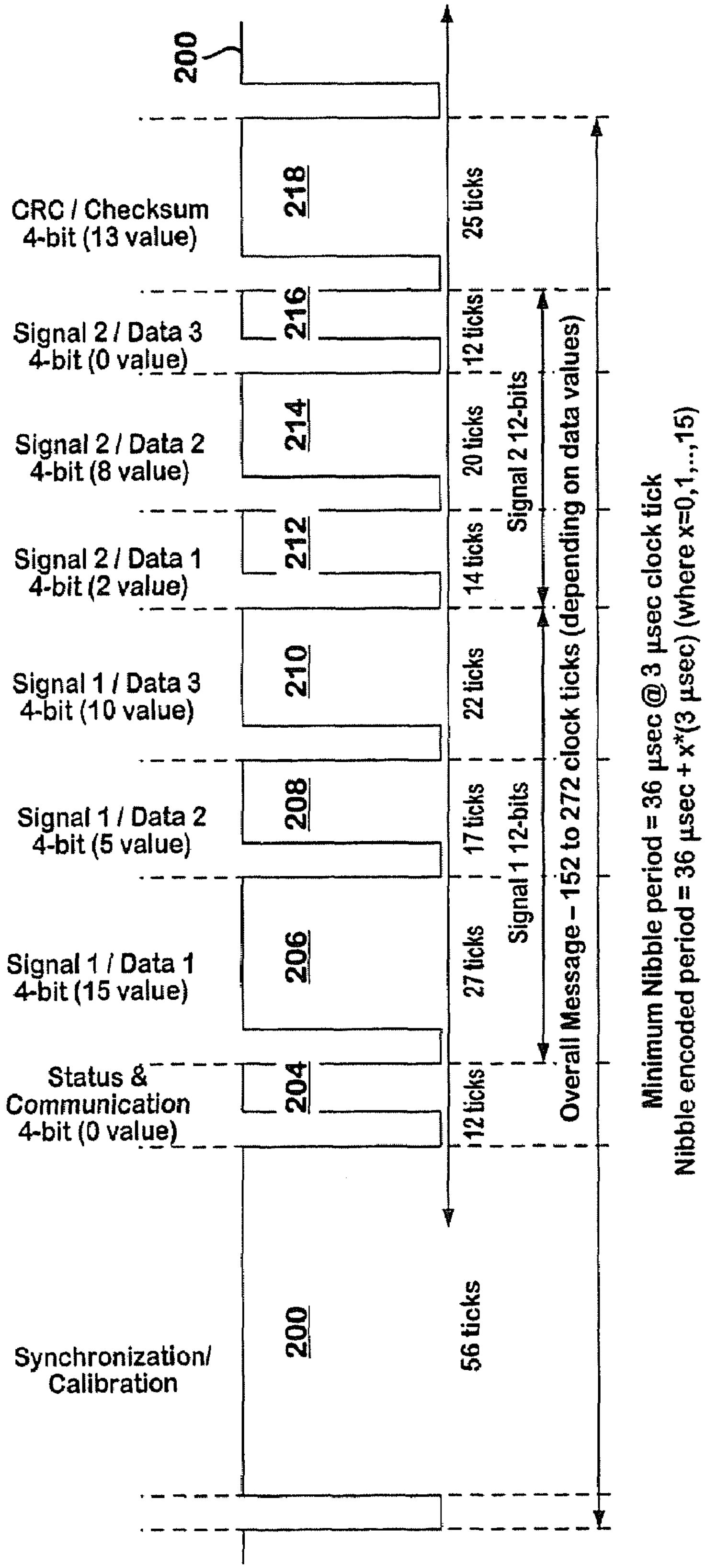
FIG. 4 is a timing plot of a SENT signal according to the present disclosure.

Referring now to FIG. 4, the signal from the transmitter module 124 to the receiver module 130 may include various formats. One suitable format is that described in the Society of Automotive Engineers (SAE) J2716 Report. In the following example, a signal message 200 for two 12-bit sensor values assuming a three microsecond clock tick is illustrated. A synchronization or calibration pulse 202 having a predetermined length may be provided so that corrections may be made for the transmitter clock variations. A status and communication portion 204 may also be provided. This portion may be reserved for a sensor or sensors to communicate various information such as part numbers or fault information. Various data for a first signal may be provided at signal/data portions 206, 208 and 210. Data portions for a second signal may be provided at 212, 214 and 216. A cyclic redundancy check or check sum portion 218 may also be provided within the signal 200. The Signal1 portion and Signal2 portion may correspond to two throttle position sensor signals. Of course, in a one-throttle position sensor signal system, only one of the signal portions may be provided.

Figure 2:
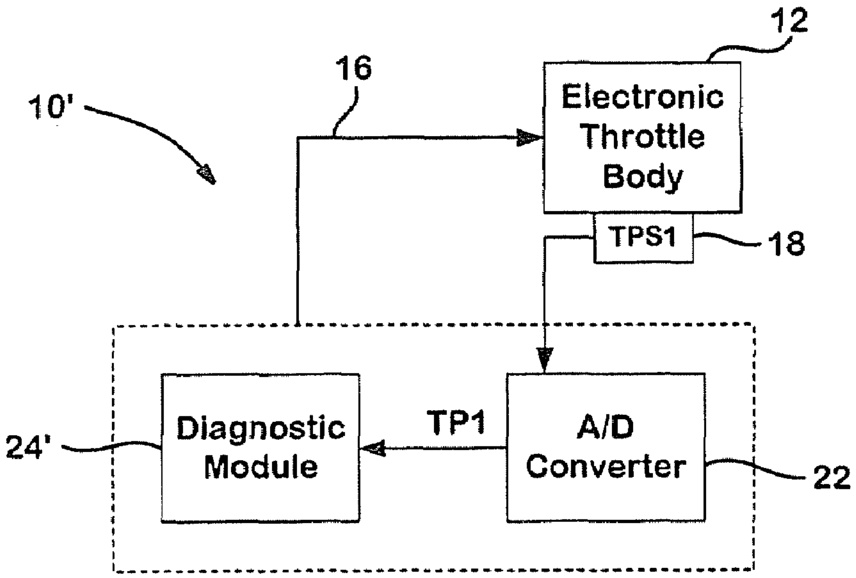
FIG. 2 Prior Art
FIG. 2 is a block diagrammatic view of a single-throttle position sensor throttle control system according to the prior art.

As can be seen by the above signal, a simpler lower-cost communication scheme is provided than that of the analog-to-digital signals produced in the prior art FIGS. 1 and 2. The sensor signals provided within the signal 200 may be transmitted as a series of pulses with data measured as a time between consecutive falling edges. It is envisioned that a throttle position sensor may have a defined sequence using a calibration pulse followed by a constant number of short "nibble" pulses.

Figure 5:
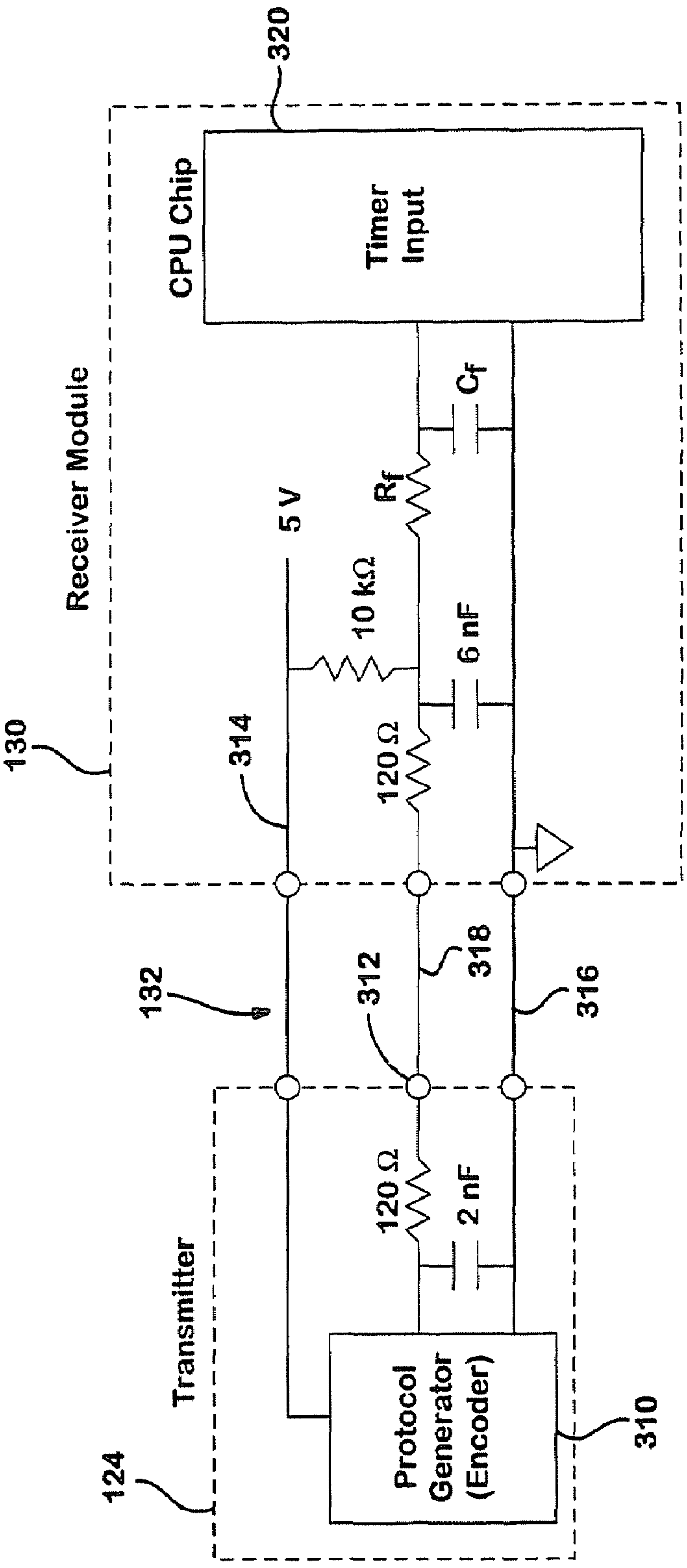
FIG. 5 is a schematic view of the transmitter and the receiver of FIG. 3.

Referring now to FIG. 5, the transmitter module 124 in communication with the receiver module 130 through wiring 132 is illustrated in further detail. A protocol generator or encoder 310 is used to encode the signals from the throttle position sensor or sensors into the proper format. As mentioned above, the SENT format which uses falling-edge-to-falling-edge timing to communicate data may be used. As illustrated, a 120 ohm resistor and a 2 nanofarad capacitor is in communication with an output pin 312 to attenuate RF energy on the external communication line 132. The receiver module 130 may also include a resistance such as a 120 ohm resistor and a capacitance such as a 6 nanofarad capacitor to reduce radiated EMC emissions. The wiring may also include a power source signal line 314 and a ground signal line 316. Other RF components may include another resistance such as resistor $R_f$ and another capacitance such as capacitor $C_f$ together with yet another resistance such as 10 kiloohm resistor. The 10 kiloohm resistor may be coupled between the reference voltage and the signal wire 318. The resistor $R_f$ and the capacitor $C_f$ may be in series with the output pin and signal wire 318. A CPU chip 320 may receive the signal line and generate a replicated throttle position sensor based upon the timing. In this example, the timing is determined between consecutive falling edges. The time between the falling edges may thus correspond to data.

Figure 6:
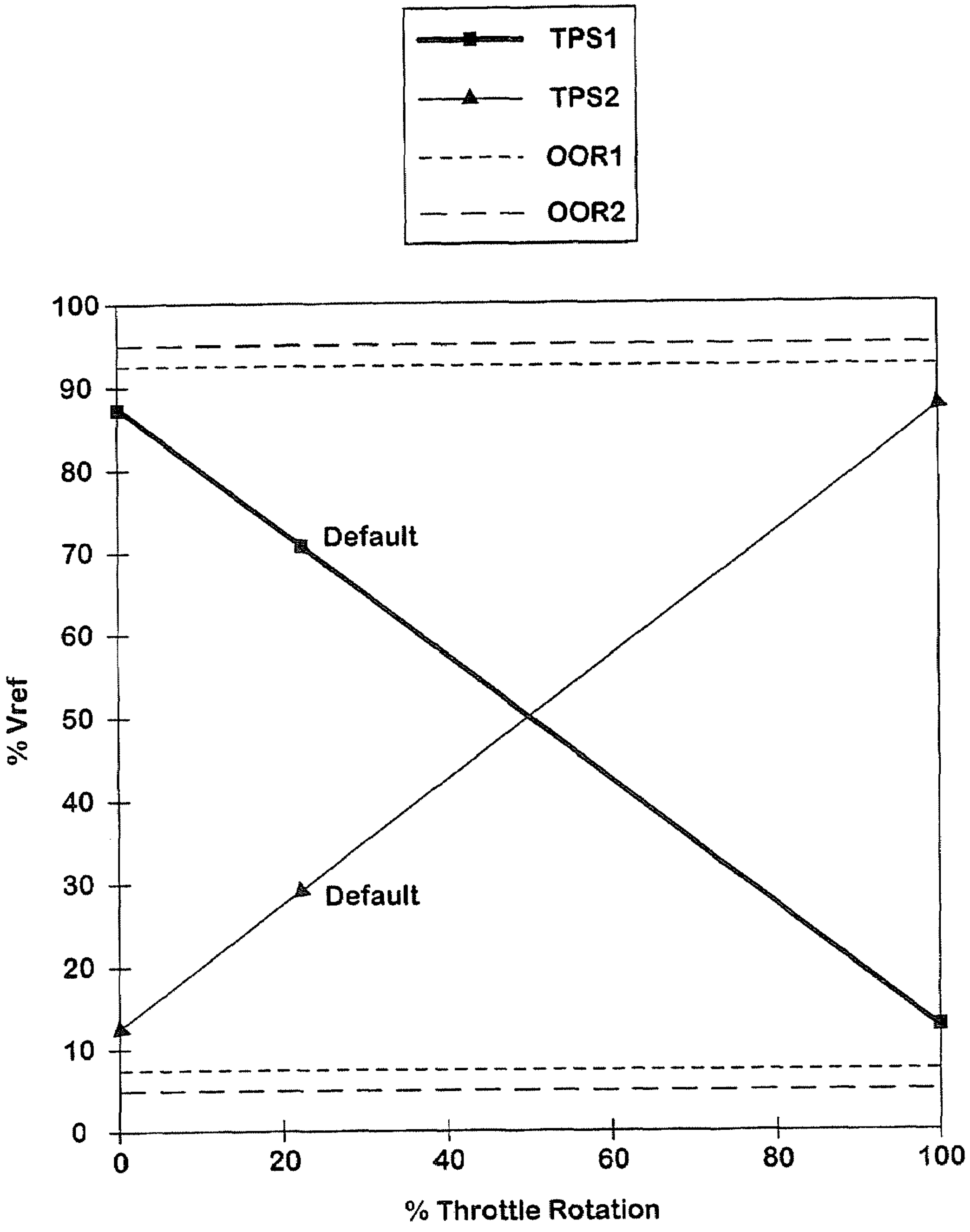
FIG. 6 is a plot of percentage of reference voltage versus percent of throttle rotation for throttle position sensor measurements.

Referring now to FIG. 6, the diagnostic module 134 illustrated in FIG. 3 may generate diagnostic signals corresponding to the state of the replicated throttle position sensor signal or signals. Should only one throttle position sensor be present, the receiver module 130 generates a replicated second throttle position sensor signal that is the inverse of the first throttle position sensor signal. Thus, both of the throttle signals have a corresponding out-of-range signal. The first out-of-range signal is generated when the first throttle position sensor signal is too high or out of range high. The second out-of-range signal is generated when the second throttle position sensor is out of range low. Diagnostics, throttle waiting and remedial actions are well understood in response to various fault combinations.

Figure 7:
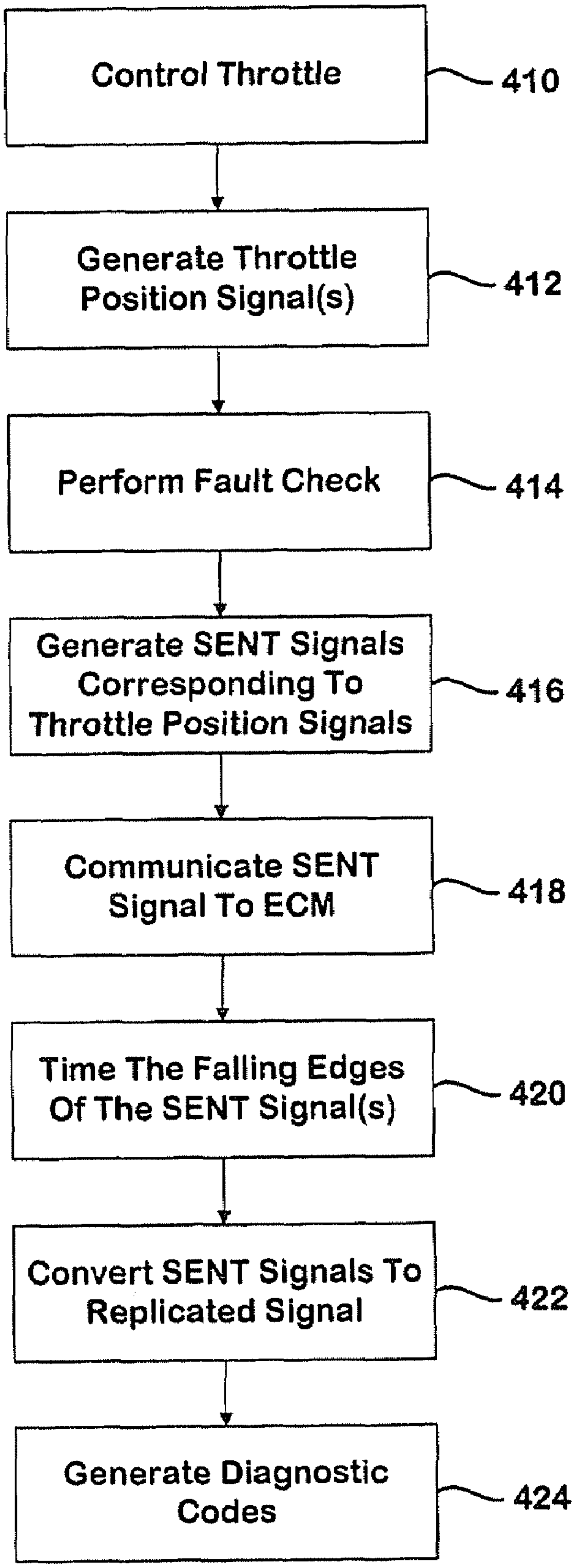
FIG. 7 is a flowchart of a method for operating the throttle position sensor and diagnostics associated therewith.

Referring now to FIG. 7, a method for controlling the throttle and generating diagnostic signals is set forth. In step 410, the throttle is generally controlled in response to a vehicle operator input such as an input from a throttle pedal. Throttle position signals may be generated at one- or two-throttle position sensors. In step 414, a fault check may be performed on the throttle position sensor signal or signals. In step 416, SENT signals may be encoded and communicated to the receiving module. As mentioned above, the SENT signals may have data corresponding to the time between falling edges of a signal. In step 418, the SENT signals are communicated to the electronic control module and the receiver module therein. In step 420, the time between the falling edges of the SENT signals is determined. In step 422, the SENT signals are converted to replicated throttle position sensor signals. If only one throttle position sensor signal is provided, a second signal corresponding to the first signal is determined. The second signal may be an inverse signal corresponding to the first throttle position sensor signal.

After the SENT signals are converted to replicated signals corresponding to the original throttle position sensor signals, the replicated signals are communicated to the diagnostic module 134 of FIG. 3 to determine any irregularities in the signals. Diagnostic codes may be set when comparing the various signals.

As can be seen by the above, a one-throttle position sensor system is converted into a two-throttle position signal system. Thus, common codes and software may be used in the diagnostic module 134. The diagnostic module coding may thus be used for a single-throttle position sensor signal and a dual-throttle position sensor signal system without modification.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:

receiving an encoded throttle position sensor signal from a throttle body;

forming a first replicated throttle position sensor signal and a second replicated second throttle position sensor signal from the encoded signal; and communicating the first replicated throttle position sensor signal and the second throttle position sensor signal to a diagnostics module.

2. A method as recited in claim 1 further comprising:

prior to receiving, generating a throttle position sensor signal from a first throttle position sensor; and encoding the throttle position sensor signal to form the encoded signal.

3. A method as recited in claim 2 wherein generating a throttle position sensor comprises generating the throttle position sensor signal at an electronic throttle.

4. A method as recited in claim 1 further comprising determining errors from the first replicated throttle position signal and the second replicated throttle position signal.

5. A method as recited in claim 4 further comprising when errors in the first replicated throttle position signal or second replicated throttle position signal occur, generating a diagnostic code indicative of the error in the first replicated throttle position sensor signal or second replicated throttle position sensor signal.

6. A method as recited in claim 1 wherein the second replicated throttle position sensor signal is an inverted first replicated throttle position signal.

7. A method as recited in claim 1 wherein the first replicated throttle position sensor signal corresponds to a time between two falling edges of the encoded signal.

8. A method as recited in claim 1 further comprising controlling a motor of an electronic throttle in response to the first replicated throttle position sensor signal.

9. A method as recited in claim 1 further comprising performing diagnostics on the first replicated throttle position signal and the second replicated throttle position signal in the diagnostics module.

10. A system comprising:

a throttle body generating a throttle position sensor signal and encoding the throttle position sensor signal to form an encoded throttle position sensor signal; and an electronic control module receiving the encoded throttle position sensor signal from a throttle body, forming a first replicated throttle position sensor signal and a second replicated second throttle position sensor signal from the encoded signal and communicating the first replicated throttle position sensor signal and the second throttle position sensor signal to a diagnostics module.

11. A system as recited in claim 10 wherein the throttle body comprises an electronic throttle.

12. A system as recited in claim 10 wherein the diagnostics module determines errors from the first replicated throttle position sensor signal and the second replicated throttle position sensor signal.

13. A system as recited in claim 12 wherein the diagnostics code generates a diagnostic code indicative of the errors in the first replicated throttle position sensor signal and the second replicated throttle position sensor signal.

14. A system as recited in claim 10 wherein the second replicated throttle position sensor signal is an inverted first replicated throttle position signal.

15. A system as recited in claim 10 wherein the first replicated throttle position sensor signal corresponds to a time between two falling edges of the encoded signal.

16. A system as recited in claim 10 wherein the throttle body comprises a motor, said electronic control module controlling the motor in response to the first replicated throttle position sensor signal.

17. A system as recited in claim 10 wherein the diagnostics module performs diagnostics on the first replicated throttle position signal and the second replicated throttle position signal.

* * * * *